United States Patent
Kumar et al.

(10) Patent No.: US 9,779,026 B2
(45) Date of Patent: Oct. 3, 2017

(54) CACHE BYPASS UTILIZING A BINARY TREE

(71) Applicant: Seagate Technology LLC, Cupertino, CA (US)

(72) Inventors: Amit Kumar, Bangalore (IN); Pradeep Radhakrishna Venkatesha, Bangalore (IN); Shashikiran Venkatesh, Bangalore (IN)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 79 days.

(21) Appl. No.: 14/995,740

(22) Filed: Jan. 14, 2016

(65) Prior Publication Data

US 2017/0206166 A1 Jul. 20, 2017

(51) Int. Cl.
*G06F 12/00* (2006.01)
*G06F 12/0888* (2016.01)
*G06F 12/0831* (2016.01)
*G06F 17/30* (2006.01)
*G06F 12/128* (2016.01)

(52) U.S. Cl.
CPC ...... *G06F 12/0888* (2013.01); *G06F 12/0833* (2013.01); *G06F 12/128* (2013.01); *G06F 17/302* (2013.01); *G06F 17/30132* (2013.01); *G06F 17/30171* (2013.01); *G06F 17/30327* (2013.01); *G06F 2212/6046* (2013.01); *G06F 2212/621* (2013.01); *G06F 2212/69* (2013.01)

(58) Field of Classification Search
None
See application file for complete search history.

(56) References Cited

U.S. PATENT DOCUMENTS

| | | |
|---|---|---|
| 6,922,754 B2 | 7/2005 | Liu et al. |
| 7,725,661 B2 | 5/2010 | Liu et al. |
| 8,898,423 B1 | 11/2014 | Guda et al. |
| 2012/0117324 A1* | 5/2012 | Solina, II ............ G06F 12/0871 711/118 |
| 2012/0137075 A1 | 5/2012 | Vorbach |
| 2013/0254477 A1 | 9/2013 | Swanson et al. |
| 2013/0318283 A1 | 11/2013 | Small et al. |
| 2015/0026403 A1* | 1/2015 | Ish ...................... G06F 12/0868 711/118 |

* cited by examiner

*Primary Examiner* — Brian Peugh
(74) *Attorney, Agent, or Firm* — Hollingsworth Davis, LLC

(57) ABSTRACT

A storage command is received at a block level interface from a file system. The storage command is associated with a window of a virtual drive. One of a plurality of binary trees is selected based on the window being associated with the storage command, each of the binary trees being associated with a plurality of windows. If a data storage size of the storage command exceeds a threshold, a window identifier of the window is added to the selected binary tree to indicate the command will bypass a cache and send data of the storage command directly to main data storage.

20 Claims, 10 Drawing Sheets

| 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| 0 | 1 | 0 | 0 | 0 | 0 | 1 | 0 | 0 | 0 | 0 | 0 | 1 | 1 | 0 | 0 | 0 | 0 | 0 | 0 |

```
//-------------------------------------------------------
// Structure to keep the information for AVL tree
// and the information about virtual disk windows mapped to
// this tree.
//-------------------------------------------------------
typedef struct bypassio_tree {
    LIO_TREE_NODE  tree_node[MAX_OUTSTANDING_IO];//Tree node pool
    u32            io_bucket; // Index into AVL array
    atomic_t       large_io_pending_counter[MAX_OUTSTANDING_IO];
    u64            node_free_bitmap;   //Indicates free nodes
                                       //for this AVL tree
    spinlock_t     *bypassio_tree_spinlock; // Spin lock to
                                            // protect the tree
    wait_q         *io_context;   // If large I/O is in-flight,
                                  // small I/Os will be waiting
                                  // until all pending
                                  // large I/Os are completed
} _bypassio_tree_t;

//-------------------------------------------------------
// Array of AVL trees (number of AVL tree is equal to queue
// depth), where each tree can contain node information of
// defined virtual disk windows.
//-------------------------------------------------------
_bypassio_tree_t bypassio_tree_pool[MAX_OUTSTANDING_IO];

// ©2015 Seagate, Inc.
```

*FIG. 7*

CACHE BYPASS UTILIZING A BINARY TREE

SUMMARY

The present disclosure is directed to a cache bypass that utilizes a binary tree. In one embodiment, a storage command is received at a block level interface from a file system. The storage command is associated with a window of a virtual drive. One of a plurality of binary trees is selected based on the window being associated with the storage command, each of the binary trees being associated with a plurality of windows. If a data storage size of the storage command exceeds a threshold, a window identifier of the window is added to the selected binary tree to indicate the command will bypass a cache and send data of the storage command directly to a main data storage. If the data storage size does not exceed the threshold, the window identifier is searched for in the selected binary tree and the storage command is put in a wait queue before caching the storage command in the cache if the window identifier is found.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

FIG. 7 is a code listing of data structures according to an example embodiment;

DETAILED DESCRIPTION

Figure 1:
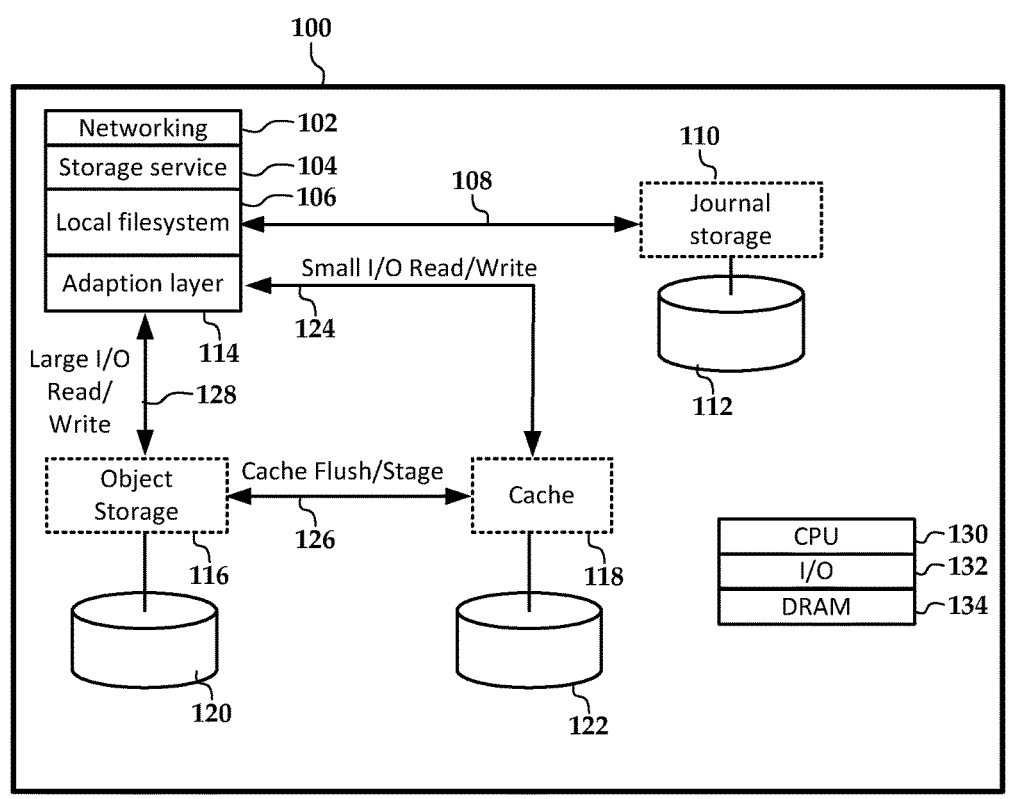
FIG. 1 is a block diagram of an apparatus according to an example embodiment.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The present disclosure generally relates to caching mechanisms used in persistent data storage. In some embodiments, the caching is performed in large-scale distributed storage systems. For example, systems such as cluster computing, grid computing, cloud computing, utilize large numbers of functional nodes for tasks such as processing and data storage/retrieval. These resources can be used to perform parallel computing using large numbers of networked computing nodes. While the example described below may be in the context of distributed storage, it will be understood that the same or similar concepts described herein may be relevant to smaller-scale systems, such as hybrid drives that use different layers of persistent memory.

Persistent storage nodes may use a hierarchy of storage, ranging from one or more relatively slower layers with high capacity, and one or more relatively faster layers with lower capacity. Generally, the slower layers are less expensive per unit of storage, and so can be used without impacting overall system performance, e.g., used for data that is not actively being used by a processing node. Some aspects of the data (e.g., expected frequency of access, randomness) and the physical storage devices (e.g., random/sequential throughput) may also dictate which storage layer may be used to provide a balance between cost and speed.

For example, if hard disk drives (HDDs) are used for the slower layer of storage and solid state drives (SSDs) that use flash memory are used for the faster layer, the SSDs will provide superior random read/write performance. However, for large sequential reads/writes, the difference in throughput may be less pronounced, in which case the HDD may be utilized without significant performance impact. This may be particularly true for some types of HDDs, such as shingled magnetic recording (SMR). An SMR drive overlays adjacent tracks on each other in order to reduce track width. This may involve writing large numbers of tracks in sequence, and so is well suited to application utilize large, sequential writes and reads.

A storage node may use a cache manager that runs in firmware or software that selects a layer of memory for storage. The cache manager may manage other tasks, such as flushing data from a cache and predictively moving data into the cache. A cache manager may use more than two layers of cache, and be implemented between the filesystem used by the operating system and the device drivers used to access the virtual and physical storage device.

In a flash-memory-based caching solution, it may be desirable to we have to bypass large and sequential input/output (I/O) operations directly to a level of storage such as a hard drive that has acceptable sequential performance but slower random I/O performance. Each I/O operation may need to go through caching logic such as hash table lookups and I/O locking mechanism to make sure the data integrity and consistency is maintained. In a multi-core, multi-processor environment all these caching data structures may be protected by structures such as spinlocks, which add additional overhead just to bypass a large or sequential stream of I/O, resulting in performance overheads.

The embodiments described below are implemented in distributed file systems. Generally, a distributed file system is a network file system in which the data can be accessed by different computing nodes across a network. One type of distributed file system is a clustered file system, which data of the filesystem is distributed across different server nodes. A clustered filesystem may support parallelism, which allows multiple clients to mount the same filesystems and access the same files at the same time. An example of a parallel, clustered file system is shown in the block diagram of an apparatus 100 in FIG. 1, which is configured as a distributed filesystem server.

The file system includes a networking layer 102 that includes networking protocols (e.g., TCP/IP, proprietary cluster network protocols) and procedure call interfaces. A storage service 104 manages the network filesystem transactions, including object definition, storage, and retrieval. In one embodiment, the storage service 104 is a Lustre object storage server (OSS) that stores data in object storage targets (OST). In such an arrangement, the metadata used by the Lustre file system may be managed by a separate metadata service, either on the same node as the OSS and/or (more commonly) on one or more different nodes.

The storage service 104 accesses storage devices (e.g., HDD, SSD) using a local filesystem 108. Generally, the local filesystem includes data structures that are written to the storage devices to define, among other things, block addresses where data is stored, metadata describing the data (e.g., filenames, permissions, etc.), and relationships (e.g., directories and directory hierarchies). The Lustre filesystem can utilize ldiskfs (an enhanced version of ext4) or ZFS. As indicated by path 108, the local filesystem 108 may use a separate logical volume 110 for some metadata storage (e.g., journaling data). The journal storage volume 110 is mapped to a physical partition 112, which may include a RAID partition accessed via a RAID controller.

The present disclosure describes computer systems configured to intelligently redirect I/O based on size either to a first or second tier (e.g., HDD and SSD tier) with minimal latency and locking overhead. This is indicated by adaptation layer 114, which operates at a lower level than the filesystem 106. Two logical volumes 116, 118 are used for object storage and caching, and utilize respective physical partitions 120, 122. The partitions 120, 122 represent respective slower and faster tiers of persistent memory, e.g., HDD and SSD, and are used respectively as a main data storage and a cache.

Normally, data would first be written to or read from the faster tier 122 which caches the data to increase throughput. This is shown by small I/O read/write operation 124, and cache flush/stage operation 126. Caching may be bypassed for certain operations such as large, sequential writes, as indicated by operation 130. As will be described below, a caching adaptation layer will include features that allow cache bypass to occur with minimal caching library overhead and reducing lock contention.

The components shown in FIG. 1 may be implemented in any combination of hardware, firmware, and hardware, and may be distributed among a plurality of computing nodes. The illustrated apparatus 100 includes at least one or more processors 130, I/O circuitry 132, and volatile memory such as dynamic random-access memory (DRAM) 134. The I/O circuitry 132 may include peripheral busses, peripheral devices (e.g., network adaptors, video adaptors, user input devices), storage interfaces, etc.

Figure 2:
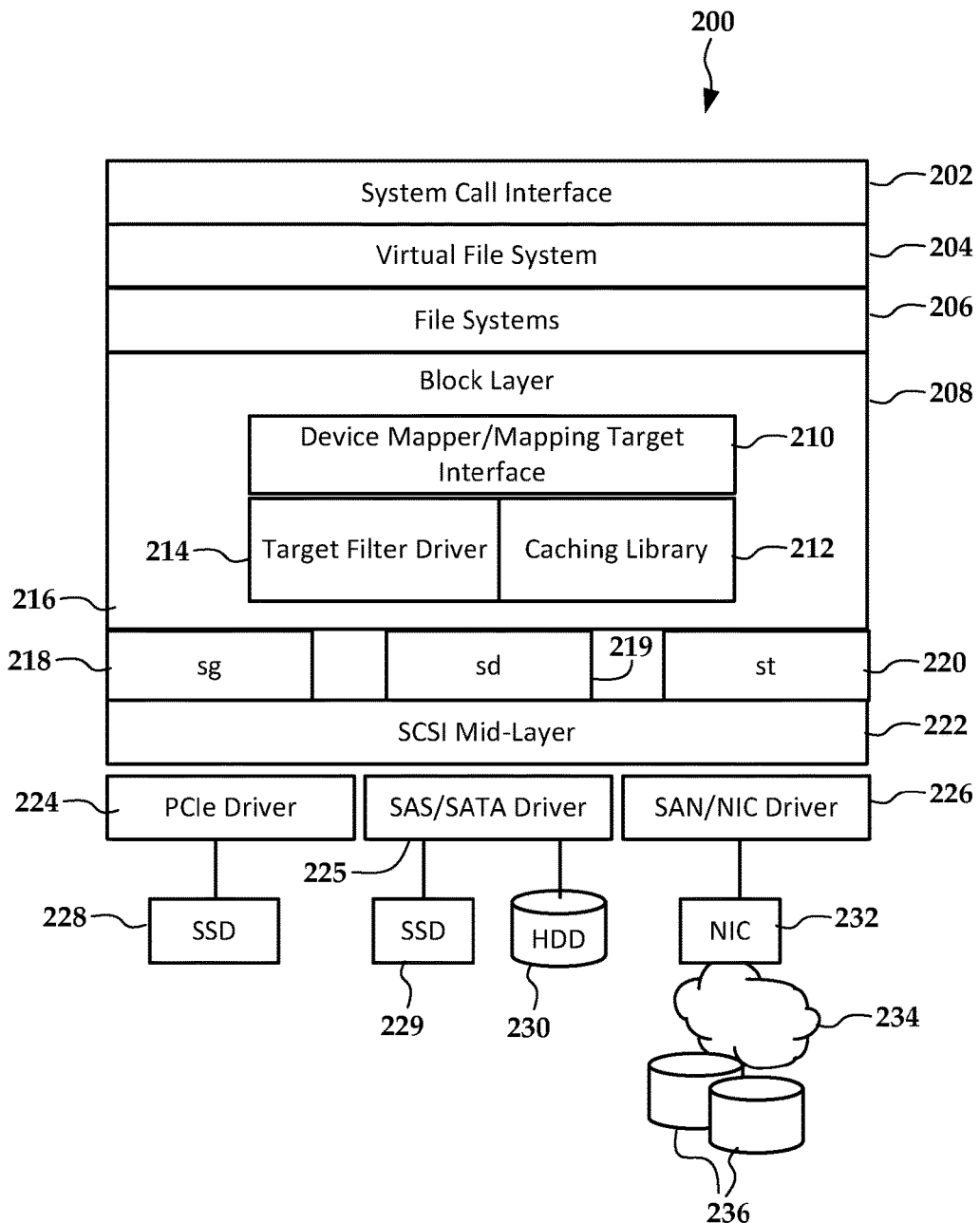
FIG. 2 is a block diagram of a filesystem caching architecture according to an example embodiment.

In reference now to FIG. 2, a block diagram illustrates an architecture 200 that uses a caching adaptation layer according to an example embodiment. A system call interface 202 services file system requests, such as a Lustre OSS interface. A virtual file system 202 provides a generic file system interface that abstracts different physical filesystems 206 that have different characteristics. For example, the filesystems 206 may include any combination of ext4, ldiskfs, ZFS, ntfs, etc., and are generally managed by existing operating system (OS) drivers.

A block layer 208 is located between the filesystems 206 and the device nodes 218-219 used by the OS for block level access of storage media. As will be described in further detail below, the block layer 208 processes block-level calls to access physical storage devices and provides caching and bypass operations described herein. A SCSI mid-layer 222 is used in Linux systems, and routes data packets between the upper layer nodes 218-219 and the corresponding devices in the lower layer. The SCSI mid-layer 222 manages command queues, provides error handling and power management functions, and responds to I/O control requests.

The layer below the SCI mid-layer 222 includes hardware drivers 224-226 that facilitate communicating via various hardware busses such as PCIe, SAS, SATA, etc. Drivers 224 and 225 facilitate communicating with local storage devices 228-230. Driver 226 facilitates communications over a network 234 via a network interface card (NIC) 232. Remotely located data storage devices 236 can be accessed using network file system protocols.

As noted above, the block layer 208 is an intermediary layer between the filesystems 208 and the device nodes 206. The block layer 208 can be hardware-agnostic, and work with any block devices shown. The caching functions of the block layer 208 can work across locally and remotely-coupled volumes. The block layer includes an interface 210 that facilitates receiving block-level I/O calls from the filesystems 206. The interface 210 allows the block layer 208 to transparently work with block accesses originating from the filesystems 206 and higher-level layers.

A filter driver 214 can be implemented as a device mapper target driver. A device mapper is a concept used, e.g., in the Linux kernel, for mapping physical block devices on to higher level virtual-block devices like RAID volumes, dm-cache devices, etc. In such a case, when the caching filter driver 214 is loaded, it will create a logical device mapper target (e.g., dm-sdb) on a physical "sdb" device. The filter driver 214 intercepts I/O calls routes them through the core caching library 212 for system-level caching. The caching library 212 can be compiled as a kernel module/driver with well-defined application program interfaces (APIs). The core caching functions of the library 212 can be implemented as an OS-agnostic portable library. Although the example embodiment shown in FIG. 2 is of a Lustre-type clustered file system, the embodiments described below may be applicable to other distributed file systems, such as Ceph.

Figure 3:
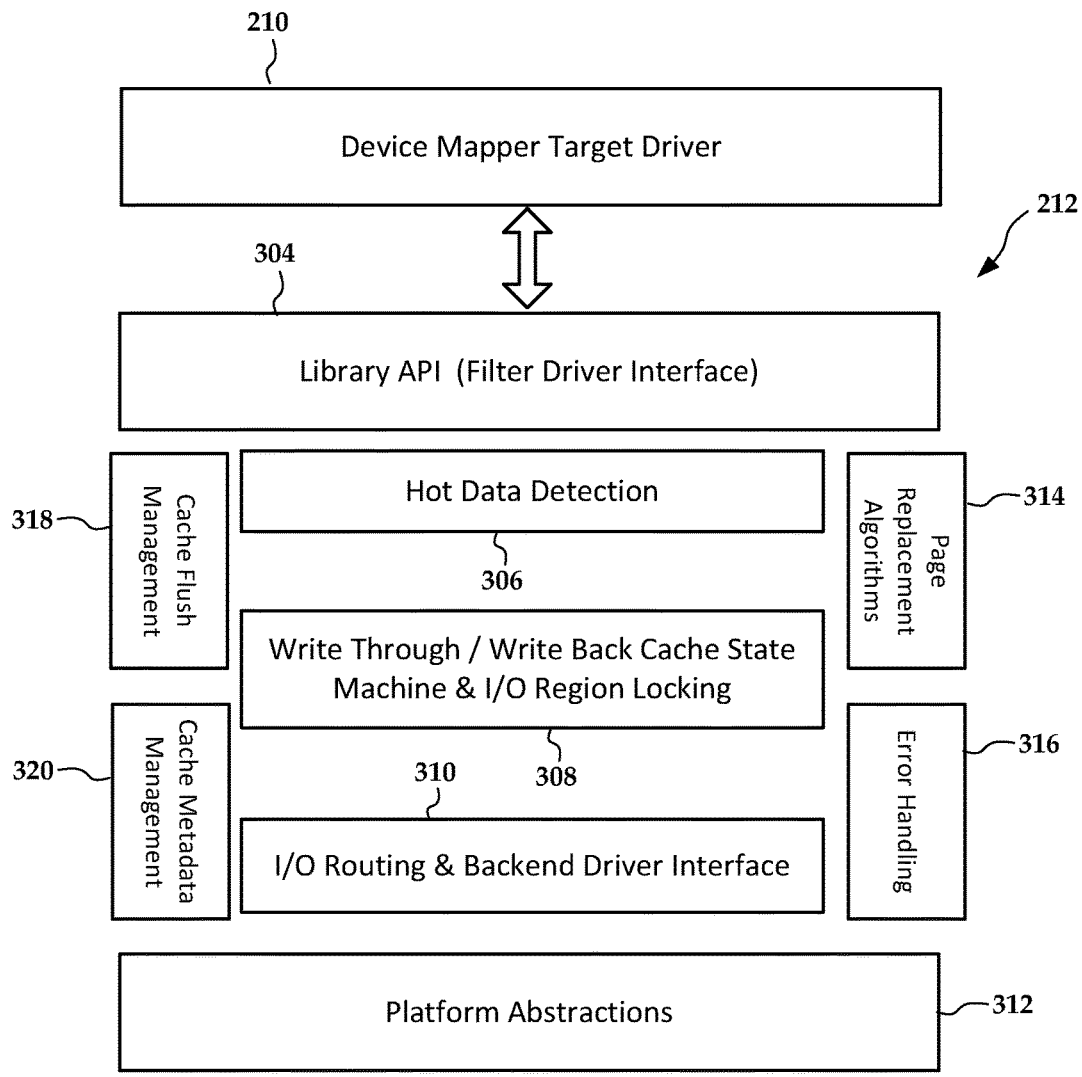
FIG. 3 is a block diagram of a caching library according to an example embodiment.

In reference now to FIG. 3, a block diagram illustrates additional details of the caching library 212 of FIG. 2. A hot data detection module 306 measures/predicts frequency of access to particular blocks and/or sequences of blocks, e.g., in order to determine whether data should be cached, flushed from a cached, passed through the cache, etc. A write through/write back state machine 308 tracks the state of cached data, ensuring coherency of written data, determining if reads/writes should bypass the cache, etc. An I/O routing and backend driver interface 310 manages the different storage devices used for cache and main store, and may work through a platform abstractions layer 312 to ensure portability of the caching library 212.

Additional functionality of the caching library 212 includes page replacement algorithms 214 that determine criteria for moving pages in and out of cache. A cache flush management 318 deals with the mechanics of flushing the cache, e.g., locking writes to memory regions that are being flushed, updating mapping tables, etc. The addresses of cached data and other metadata is dealt with my cache metadata management module 320. An error handling module deals with error conditions (e.g., bad sectors), error reporting, etc.

The functions of the caching library 212 are used by a block adaptation layer (e.g., layer 208 in FIG. 2) to transparently perform caching between different tiers of persistent storage. Generally, to perform I/O by-pass and avoid caching library overhead, the block adaptation layer can maintain a by-pass pending I/O counter for each subdivision of storage, e.g., virtual disk windows. Also, a different set of virtual disk windows are associated with different spin locks for parallel I/O processing to avoid lock contention.

A pending counter is used to deal with large bypassed I/O operations that are currently in-flight (e.g., currently being transferred to/from main storage). While these bypass operations are still in-flight, the driver may receive one or more new small I/O requests having a cache line encompassing/overlapping that of the in-flight I/O. In such a case, this small I/O cannot be immediately serviced, e.g., a read request may end up reading the stale data and result in data inconsistency. But maintaining a pending counter for every virtual disk window and having a large array of spinlocks to put multiple windows under different spinlocks increases significant memory footprint as the total size of all virtual disks grows up to 400-500 TB.

Figure 4:
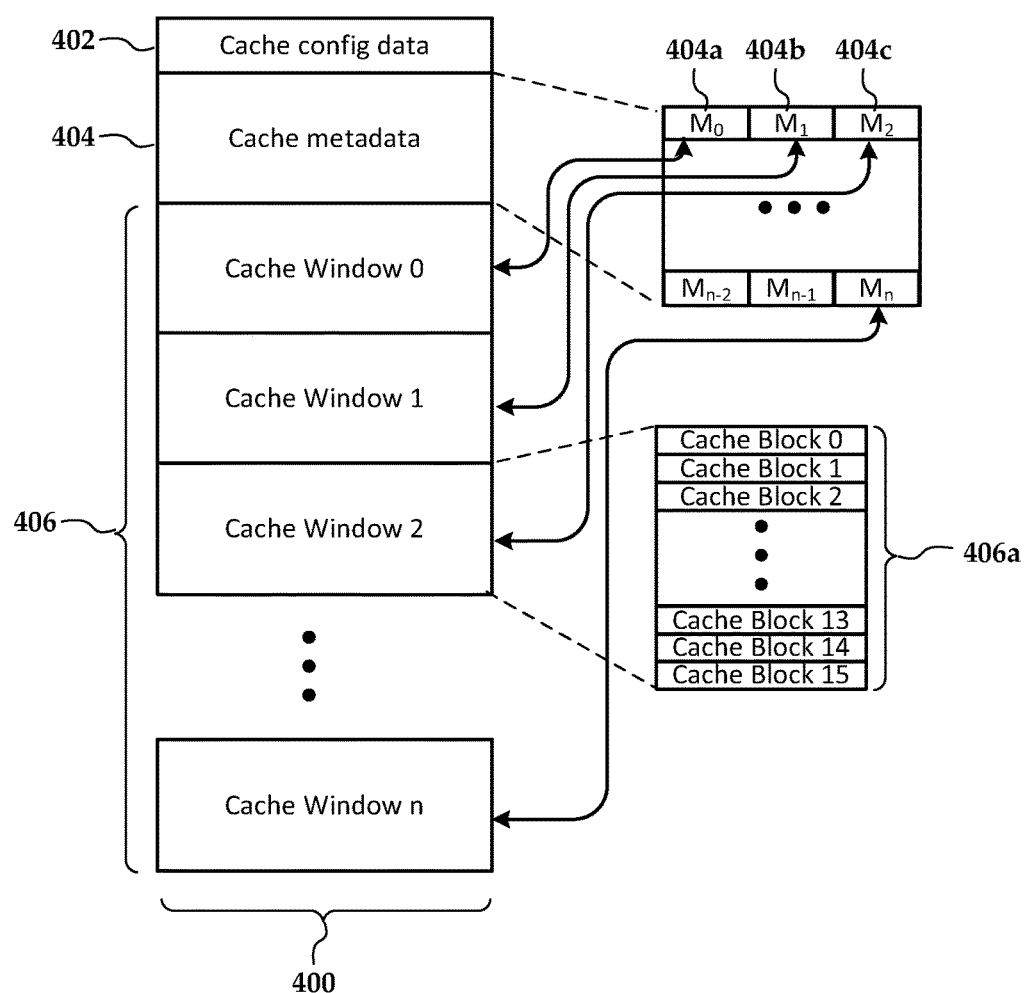
FIG. 4 is a block diagram illustrating a cache device structure according to an example embodiment.

In FIG. 4, a block diagram illustrates a cache device structure 400 according to an example embodiment. The cache device structure 400 is allocated for each virtual disk cache. The structure 400 includes regions allocated to configuration data 402 and cache metadata 404. The cache metadata region 404 is divided into sections (e.g., sections 404a-c) each storing metadata for one of the respective cache windows 404. The remainder of the structure 400 includes a series of cache windows 406. As seen by example cache window 406a, each window is divided into blocks. In this example, the cache windows are 1 MB in size, and divided into 16 blocks, each 64K in size. In this configuration, 150 MB of memory can support 400 GB of cache, 1 GB of memory can be used to support 3.2 TB of cache, etc.

The cache window 406 is the base unit for allocation, hash list management, free list management, least-recently-used (LRU) management, etc. The window and block size is configurable and may be different than in this example. Shared read/write blocks are implemented at the cache block level.

Generally, in order to map an address range to a particular region of cache, a hash table may be used. In a multi-core environment, performing a hash table lookup can induce large amounts of overhead, as well as locking I/O regions. For example, cache structures may be protected by a global spinlock, which can result in thrashing of the L2 cache of the CPU. In embodiments described below, the hash table overhead is reduced by the use of a high-level bitmap of dirty regions for the entire storage device (e.g., disk, virtual disk). Atomic read/write operations are used for reading/writing the bitmap before performing a cache bypass.

As described below, a file server apparatus allows a cache bypass decision to be performed with minimal latency and negligible memory footprint (almost independent of virtual disk size). The mechanism used for I/O redirection exhibits minimal latency using I/O-level locking instead of cache or virtual disk window level, and without increasing the memory footprint. A pool of trees structures (e.g., AVL trees) are used for I/O region locking (e.g., for inflight I/Os, not necessarily for entire logical block address range) distributed across multiple spin locks to avoid lock contentions. This arrangement assumes that only those virtual disk windows which are having in flight bypassing cache need to be protected.

Figures 5, 6:
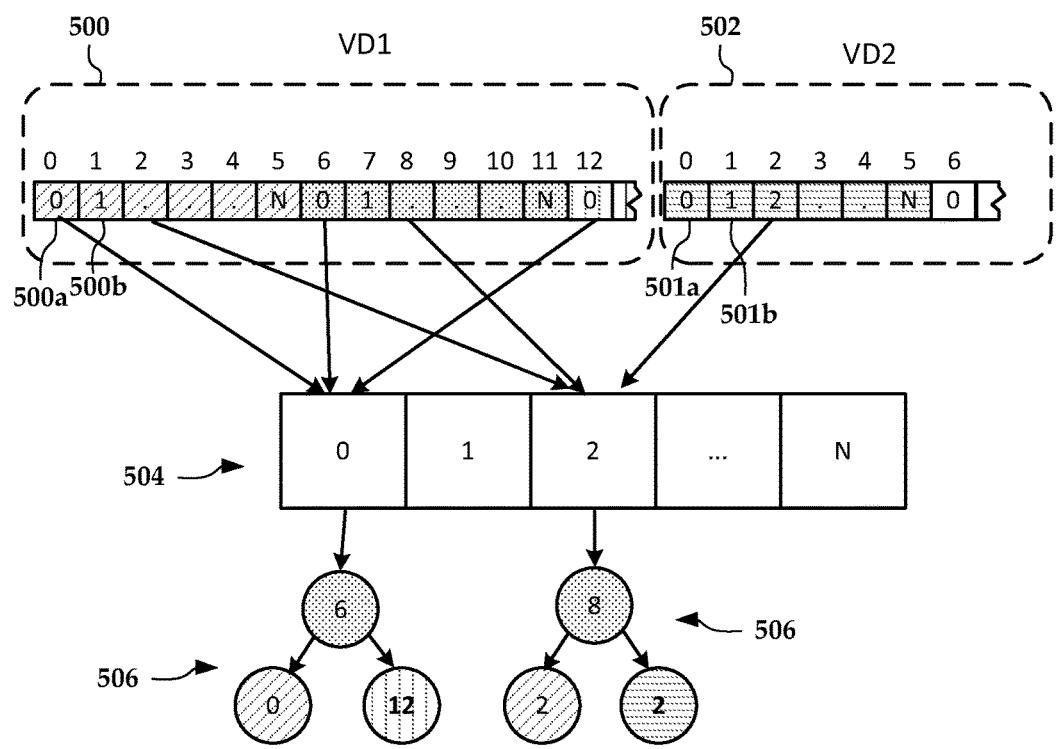
FIG. 5 is a block diagram showing a cache bypass tree pool according to an example embodiment.
FIG. 6 is a block diagram illustrating a bitmap used for marking regions according to an example embodiment.

In the block diagram of FIG. 5, a block diagram shows a cache bypass tree pool according to an example embodiment. Two virtual disks 500, 501 are shown, each divided into windows of equal size (e.g., 1 MB), e.g., windows 500a-b and 501a-b. The virtual disk windows are not to be confused with the cache windows shown in FIG. 4, although there may be a one-to-one correspondence between virtual disk windows and cache windows, e.g., an address range corresponding to an n-MB cache window may also correspond to an n-MB virtual disk window. The numbers above the windows (e.g., 0-12 for virtual disk 500) indicate logical block addresses of the virtual disks. The windows are grouped together into sets as indicated by the different shading. Each set includes N windows, where N is the maximum outstanding I/O operations handled by the filter driver. A pool of AVL trees is allocated, the blocks 504 indicating a structure pointing to a root node of each tree. Example nodes 506, 507 are shown for two of the trees. A different spinlock is allocated for each AVL tree.

As indicated by the arrows between the windows and the root nodes 504, large I/Os bypassing the cache are in-flight for logical block addresses 0, 2, 6, 8, and 12 for virtual disk 500, and for logical block address 2 for virtual disk 501. By dividing the spinlocks in this way, lock contention for the AVL trees can be minimized for large, sequential I/O operations.

In FIG. 6, a block diagram illustrates a caching bitmap 600 used for marking regions according to an example embodiment. This bitmap 600 corresponds to the state of virtual disk 500 in FIG. 5, where bits set to a value of '1' are "dirty," meaning at least part of the window has been cached (e.g., for write-back caching). This can avoid having to perform a lookup of the trees in FIG. 5 for certain operations. Atomic operations are used for reading/writing the bitmap 600 before bypassing I/Os. For small or large I/O, the corresponding AVL tree spinlock is taken, which will protect both the caching bitmap 600 and the AVL tree. If the bit is already set in the caching bitmap 600 (which indicates that window is already cached in SSD and no by-pass I/O is pending), there is no need to look-up the node in a AVL tree, below is the flow as indicated in disclosure filed.

Figure 8:
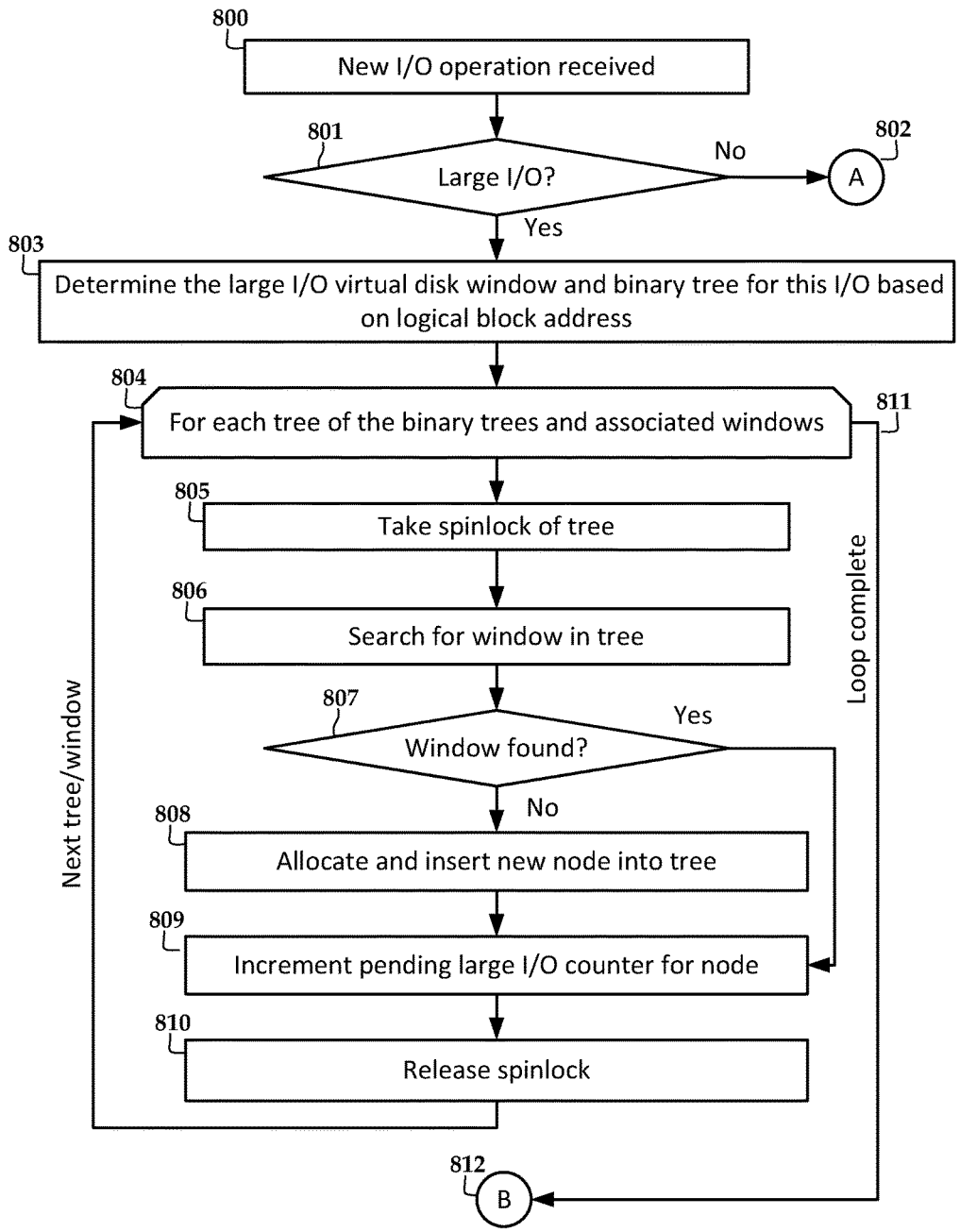
FIGS. 8-11 are flowcharts of methods according to example embodiments.
Figure 9:
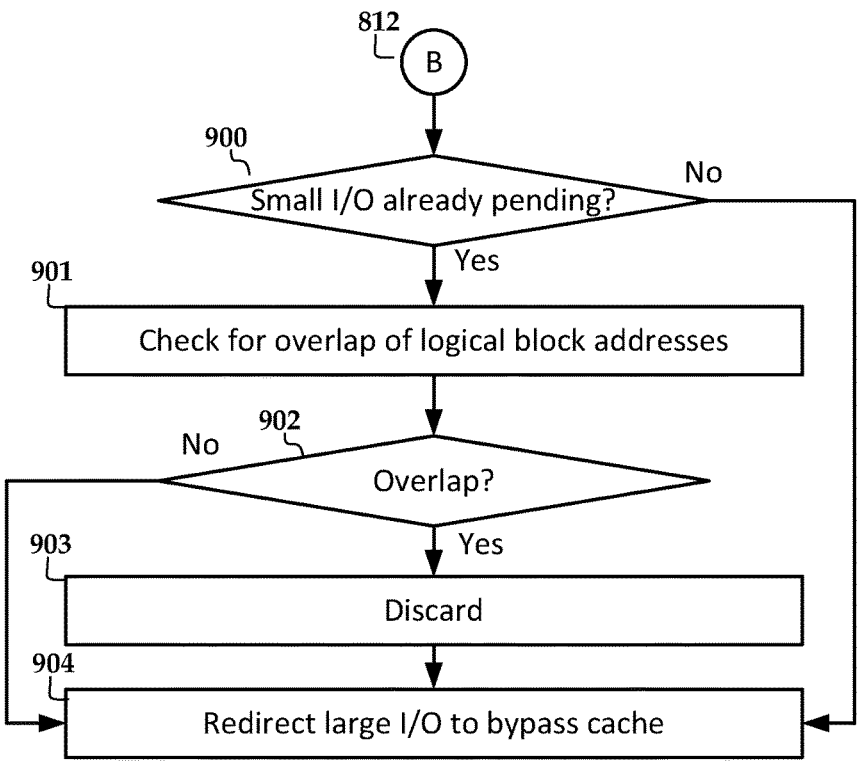
Figure 10:
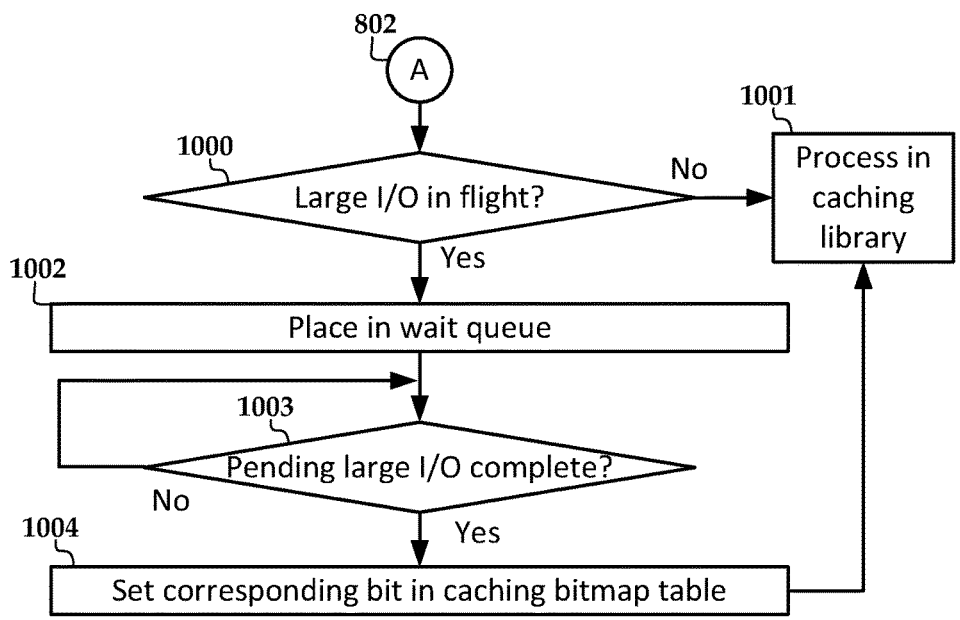

In FIG. 7, a C-language listing indicates data structures according to an example embodiment. Note that the_bypassio_tree_t structure includes an array of counters used to track all large I/O within each node of the tree. In FIGS. 8-10, a flowchart illustrates a method according to an example embodiment. The method responds to a new I/O operation being received 800, the execution path being from the filesystem to the block adaptation layer to the device. The I/O size is checked 801 to see if it is "large" as defined by the system configuration. In one example, large I/O includes I/O size greater than or equal to 128 KB. If the I/O is not large, as indicated by block 802, it is processed as shown in FIG. 10. Otherwise a large I/O virtual disk window is determined 803 based on LBA of the operation. For example, with I/O size 128K, sector size of 512K, and starting logical block address of 2000, the I/O would fall under 0th and 1st large I/O window for a window size of 1 MB. Based on the virtual disk windows, the associated binary trees (e.g., AVL trees) can also be determined 803.

Each of the binary trees determined at block 803 is processed as indicated by loop limit 804. A spinlock is taken 805 for each tree, and the associated virtual disk window is searched for 806 in the tree. If window is found (block 807 returns yes), the pending large I/O counter is incremented 809 and the spinlock is released 810. If block 807 returns no, a new tree node is allocated and inserted 808 into the tree, after which the pending large I/O counter is incremented 809 and the spinlock is released 810. When all the binary trees have been checked (as indicated by path 811) the data is completed 812 as shown in FIG. 9.

In FIG. 9, before sending out the large I/O, a check at block 900 determines if there is a small I/O already pending (but not yet in-flight) for the affected virtual drive windows. If so, overlap between the small I/O and this large I/O is checked at block 902. If there is overlap, the caching window is discarded 903 and the large I/O is redirected 904 to the main store, bypassing the cache. As such, data that was previously cached in the discarded caching window is no longer valid, and will have to be re-read from the main storage. If block 902 returns no, then the large I/O is redirected 904 to the main store. Redirection 904 will set up an I/O callback once the operation is complete, and the processing of this callback is shown in the flowchart of FIG. 11.

In FIG. 10, the procedure for new small I/O operations is continued from block 802 of FIG. 8. A check 1000 is made to see if any large I/O is in-flight for the address range of the small I/O. This may be done by first taking the spinlock of the associated AVL tree, checking the caching bitmap table. If the bit corresponding to the current window or windows is set, no overlapping large I/O is in flight, and request is processed 1001 via the cache library. If the bit is not set, the current small request is placed 1002 in a wait queue that is present in the tree node of this window (see, e.g., wait_q variable in tree structure shown in code listing of FIG. 7). Block 1003 waits (e.g., via signals, polling) to determine when the large I/O is complete. When the pending large I/O is complete, the corresponding bit in the bitmap table is set 1004, and the request is processed 1001 via the caching library.

Figure 11:
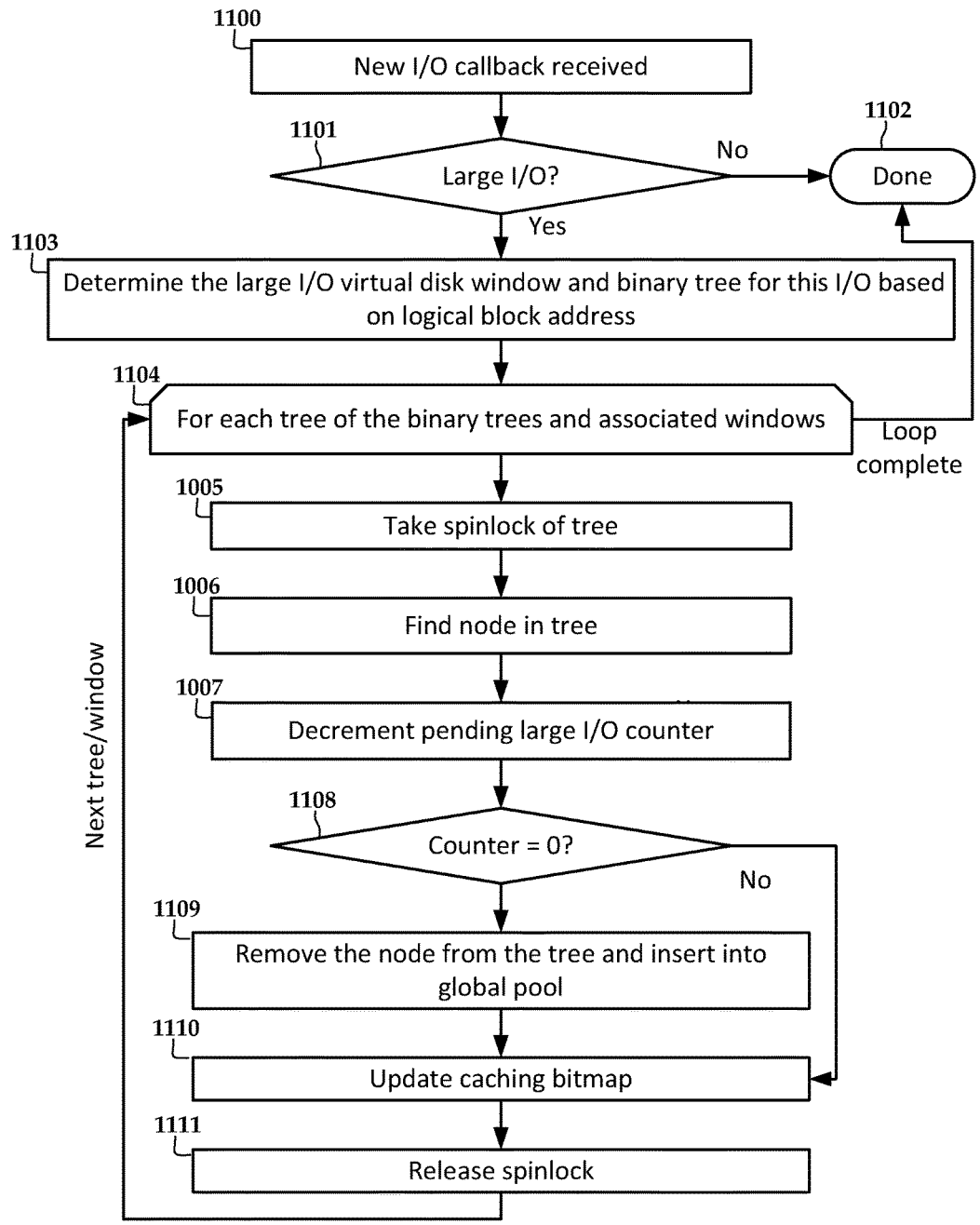

In FIG. 11, a flowchart illustrates a callback routine according to an example embodiment. The callback is received 1100 after an I/O operation has completed, e.g., via a processor interrupt from the storage device, which passes control to the caching library. If this completed operation is not large I/O (as tested at block 1101) the procedure exits (the caching library may have other handlers for small I/O not shown here). If the complete operation is large I/O, virtual disk windows are determined 1003 and iterated through 1004. A spinlock is taken/held 1005 for each tree, and the associated node is found 1106 in the tree. The pending large I/O counter is decremented 1107 for the node. If it is determined at block 1108 that the pending counter is zero, the tree node is removed 1109 from the tree and this node is placed back in the global pool of free tree nodes and the spinlock is released 1110. As indicated in block 1111, the caching bitmap may also be updated, e.g., if no cache window is present in caching library for that particular large I/O window.

The large I/O by-pass design described herein can improve performance without excessive memory use. For example, for large I/O windows of 1 MB and virtual disks of 400 TB, the caching bitmap consumes 400 TB/1 MB~400 MB bits=50 MB. The AVL tree info structure and global tree node pool consumes a few KBs. The total number of spin locks is 8 bytes times the total maximum outstanding I/Os, e.g., approximately 32 KB for one implementation. Thus the total memory consumption is about 50 MB for 400 TB virtual drives.

Figure 12:
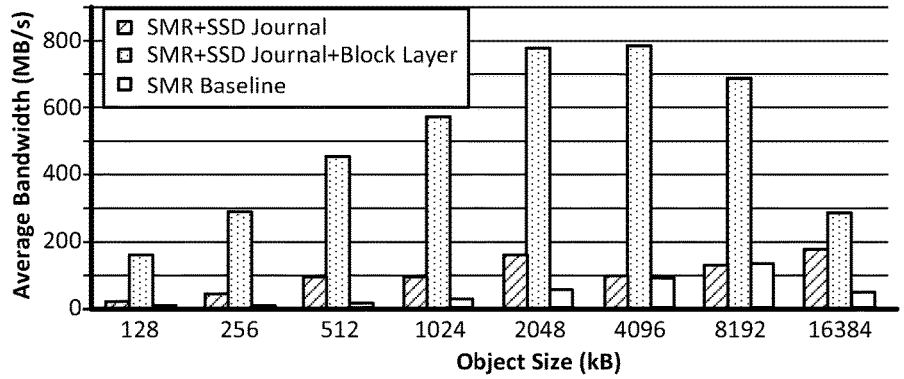
FIG. 12 is a graph showing performance of a cache bypass filter according to an example embodiment.

In FIG. 12, a graph shows bench results of a three node cluster using a cache bypass filter driver according to an example embodiment. The tested cluster utilized the Ceph filesystem with a 800 GB PCIe SSD per node, 7×8 TB SMR drives per node, and a Reliable Autonomic Distributed Object Store (RADOS) write workload with 16 threads. As seen by the different shading, the performance of a block layer using cache bypass filter driver (middle bars) is compared to a systems with SSD journaling (left bars) and SMR baseline (right bars). The latter two configurations did not use an SSD cache. The tests also measured latency induced by the filter driver for large by-pass I/O, which comes under 8-9 ms as compared to library, which induces latency in the range of 10-35 ms due to multiple global spinlocks and L2 thrashing.

Figure 13:
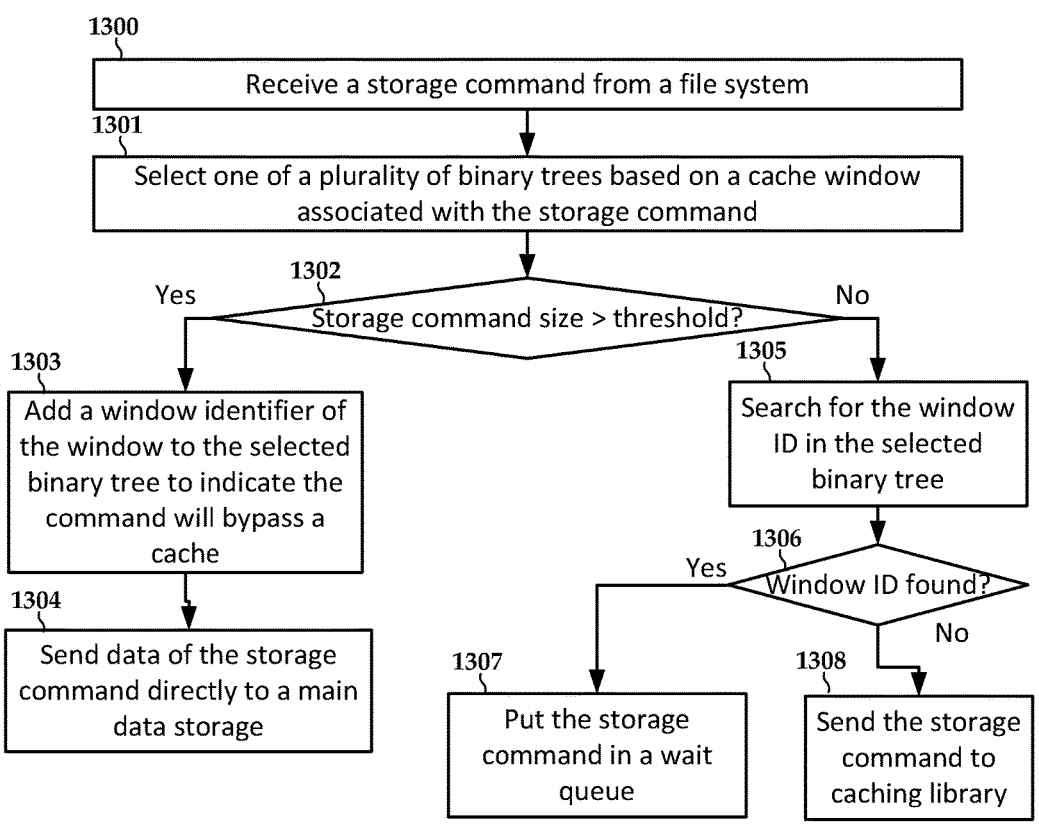
FIG. 13 is a flowchart of a method according to an example embodiment.

In FIG. 13, a flowchart shows a method according to an example embodiment. The method involves receiving 1300, at a block level interface, a storage command from a file system, the storage command associated with a cache window of a virtual drive. One of a plurality of binary trees is selected 1301 based on the cache window, each of the binary trees associated with a plurality of windows (e.g., windows from different virtual drives). If it is determined 1302 that a data storage size of the storage command exceeds a threshold, a window identifier of the window is added 1303 to the selected binary tree to indicate the command will bypass a cache. The data of the storage command is then sent 1304 directly to a main data storage; and If the data storage size does not exceed the threshold, the window identifier is searched for 1305 in the selected binary tree. If it is determined 1306 that the window identifier is found, the storage command is put 1307 in a wait queue before caching the storage command in the cache, e.g., via a caching library. If the window identifier is not found, the storage command is sent to a caching library, where it may be cached, sent to main storage, combined with other commands, etc.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
   receiving, at a block level interface, a storage command from a file system, the storage command associated with a window of a virtual drive;
   selecting one of a plurality of binary trees based on the window, each of the binary trees associated with a plurality of windows;

if a data storage size of the storage command exceeds a threshold, adding a window identifier of the window to the selected binary tree to indicate the command will bypass a cache and send data of the storage command directly to a main data storage; and if the data storage size does not exceed the threshold, searching for the window identifier in the selected binary tree and putting the storage command in a wait queue before sending the storage command to a caching library if the window identifier is found.

2. The method of claim 1, wherein each of the binary trees is associated with respective one of a plurality of spin locks, and wherein adding to the binary tree or searching in the binary tree comprises holding the associated spin lock when the tree is searched and releasing the associated spin lock when the adding or the search is complete.

3. The method of claim 1, further comprising maintaining a caching bitmap having a bit associated with each of the windows, wherein each bit is set to a predetermined value if a small storage command associated with the window is currently cached, the small storage command having a size below the threshold.

4. The method of claim 1, wherein the adding of the window identifier to the selected binary tree comprises adding a node to the tree associated with the window if the node does not already exist.

5. The method of claim 4, wherein if the data storage size of the command exceeds the threshold, performing a callback function upon completion of the command that deletes the node from the tree.

6. The method of claim 1, wherein the adding of the window identifier to the selected binary tree comprises incrementing a counter to a node of the tree associated with the window if a node already exists.

7. The method of claim 6, wherein if the data storage size of the command exceeds the threshold, performing a callback function upon completion of the command that decrements the counter.

8. The method of claim 1, wherein the filesystem comprises a distributed filesystem having a plurality of virtual drives, each of the binary trees associated with windows from two or more of the virtual drives.

9. An apparatus comprising:
an input/output bus configured to communicate with a faster storage tier configured as a cache and slower storage tier configured as a main storage; and
a processor coupled to the input/output bus and configured to:
receive, at a block level interface, a storage command from a file system, the storage command associated with a window of a virtual drive;
select one of a plurality of binary trees based on the window, each of the binary trees associated with a plurality of windows;
if a data storage size of the storage command exceeds a threshold, add a window identifier of the window to the selected binary tree to indicate the command will bypass the cache and send data of the storage command directly to the main data storage; and
if the data storage size does not exceed the threshold, search for the window identifier in the selected binary tree and put the storage command in a wait queue before sending the storage command to a caching library if the window identifier is found.

10. The apparatus of claim 9, wherein each of the binary trees is associated with respective one of a plurality of spin locks, and wherein adding to the binary tree or searching in the binary tree comprises holding the associated spin lock when the tree is searched and releasing the associated spin lock when the adding or the search is complete.

11. The apparatus of claim 9, wherein the processor is further configured to maintain a caching bitmap having a bit associated with each of the windows, wherein each bit is set to a predetermined value if a small storage command associated with the window is currently cached, the small storage command having a size below the threshold.

12. The apparatus of claim 9, wherein the adding of the window identifier to the selected binary tree comprises adding a node to the tree associated with the window if the node does not already exist.

13. The apparatus of claim 12, wherein if the data storage size of the command exceeds the threshold, performing a callback function upon completion of the command that deletes the node from the tree.

14. The apparatus of claim 9, wherein the adding of the window identifier to the selected binary tree comprises incrementing a counter to a node of the tree associated with the window if a node already exists.

15. The apparatus of claim 14, wherein if the data storage size of the command exceeds the threshold, performing a callback function upon completion of the command that decrements the counter.

16. The apparatus of claim 9, wherein the filesystem comprises a distributed filesystem having a plurality of virtual drives, each of the binary trees associated with windows from two or more of the virtual drives.

17. A distributed file system server, comprising:
a faster storage tier configured as a cache;
a slower storage tier configured as a main storage; and
a processor coupled to the faster and slower tiers of storage, configured to:
receive, at a block level interface, a storage command from a file system, the storage command associated with a window of a virtual drive;
select one of a plurality of binary trees based on the window, each of the binary trees associated with a plurality of windows;
if a data storage size of the storage command exceeds a threshold, add a window identifier of the window to the selected binary tree to indicate the command will bypass the cache and send data of the storage command directly to the main data storage; and
if the data storage size does not exceed the threshold; search for the window identifier in the selected binary tree and put the storage command in a wait queue before sending the storage command to a caching library if the window identifier is found.

18. The server of claim 17, wherein each of the binary trees is associated with respective one of a plurality of spin locks, and wherein adding to the binary tree or searching in the binary tree comprises holding the associated spin lock when the tree is searched and releasing the associated spin lock when the adding or the search is complete.

19. The server of claim 17, wherein the filesystem comprises a Ceph filesystem.

20. The server of claim 17, wherein the filesystem comprises a Lustre filesystem.

* * * * *